(12) United States Patent
Lin (10) Patent No.: US 6,418,835 B1
(45) Date of Patent: Jul. 16, 2002

(54) ROTISSERIE OVEN STRUCTURE

(76) Inventor: Ching-Mei Lin, No. 15, Lane 487, Min-Sheng Street, Kuei-Jen Shiang, Tainan Shien (TW)

( * ) Notice: Subject to any disclaimer, the term of this patent is extended or adjusted under 35 U.S.C. 154(b) by 0 days.

(21) Appl. No.: 10/058,755

(22) Filed: Jan. 30, 2002

(51) Int. Cl.$^7$ .............................. A23L 1/00; A47J 37/00; A47J 37/04; A47J 37/07

(52) U.S. Cl. .................. 99/421 H; 99/400; 99/427; 99/446; 99/447; 99/451; 99/476; 99/DIG. 14; 219/400

(58) Field of Search .......................... 99/326–333, 339, 99/340, 400, 401, 419–421 V, 426, 427, 444–450, 451, DIG. 14, 473–476; 126/41 R, 25 R, 9 R; 219/400, 401, 385, 386

(56) References Cited

U.S. PATENT DOCUMENTS

| | | | | |
|---|---|---|---|---|
| 1,263,331 A | * | 4/1918 | Lindroth | 99/446 |
| 2,618,730 A | * | 11/1952 | Panken | 99/421 H |
| 2,696,163 A | * | 12/1954 | Galley | 99/421 H |
| 2,762,293 A | * | 9/1956 | Boyajian | 99/421 P |
| 2,885,950 A | * | 5/1959 | Stoll et al. | 99/421 H |
| 3,104,605 A | * | 9/1963 | McKinney | 99/421 H |
| 3,125,015 A | * | 3/1964 | Schlaegel | 99/421 P |
| 3,196,776 A | * | 7/1965 | Norton | 99/421 P |
| 3,205,812 A | * | 9/1965 | Booth | 99/421 P |
| 3,296,957 A | * | 1/1967 | Gagnon et al. | 99/444 |
| 3,333,529 A | * | 8/1967 | Wilson | 99/421 P |
| 3,832,989 A | * | 9/1974 | Belford | 126/25 R |
| 4,214,516 A | * | 7/1980 | Friedl et al. | 99/447 |

* cited by examiner

Primary Examiner—Timothy F. Simone
(74) Attorney, Agent, or Firm—Rosenberg, Klein & Lee (57) ABSTRACT

A rotisserie oven structure includes a main body, an oil-collecting plate, an oil-guidance plate, electric heating tubes, turning trays or a rotary basket, a roasting plate, a top cover, steam-tight silicone straps and a heat circulating box. The heat from the electric heating tubes will flow into the lower inner room of the heat circulating box, and the heat is blown upward to the upper inner room by the reversal rotation of the inner fan. Because of the slope formed at the upper part of the housing and the close contact of flanged ribs and grooves, the heat in the upper part of the housing can be prevented from flowing downwardly, and the heat will flow through the upper series of heat circulating perforations into the interior of the main body so as to make the food be roasted evenly and to shorten the roasting time.

4 Claims, 8 Drawing Sheets

ROTISSERIE OVEN STRUCTURE

BACKGROUND OF THE INVENTION

1. Field of the Invention

The present invention relates to a rotisserie oven structure, and more particularly to a rotisserie oven which is provided with a heat circulating box so as to make the food be roasted evenly and to shorten the heating time.

2. Description of the Related Art

There are two types of rotisserie ovens, one is small type for toasting, roasting sausage, squid, etc., and the other one is large type for roasting whole chicken, duck, fish, meat, etc.

Referring to FIGS. 1,2,3 and 4, a conventional large rotisserie oven generally includes a main body 1, an oil-collecting plate 11, an oil-guidance plate 111, electric heating tubes 12, turning trays 13 or a rotary basket 14, a roasting plate 15, a top cover 151 and steam-tight silicone straps 16.

While being used, the food to be roasted, such as chicken, duck, fish, meat, is penetrated through the axle rods 17 or clamped by the rotary basket 14 or placed on the roasting plate 15. After the axle rods 17 are assembled with turning trays 13, two protruding posts 131 of turning trays 13 are respectively inserted into the axle sleeve 18 and against member 181 on the inner side wall. When the motor 19 starts operating, the axle rods 17 or rotary basket 14 together with the food will rotate accordingly so as to make. the food be roasted successfully.

Figure 1:
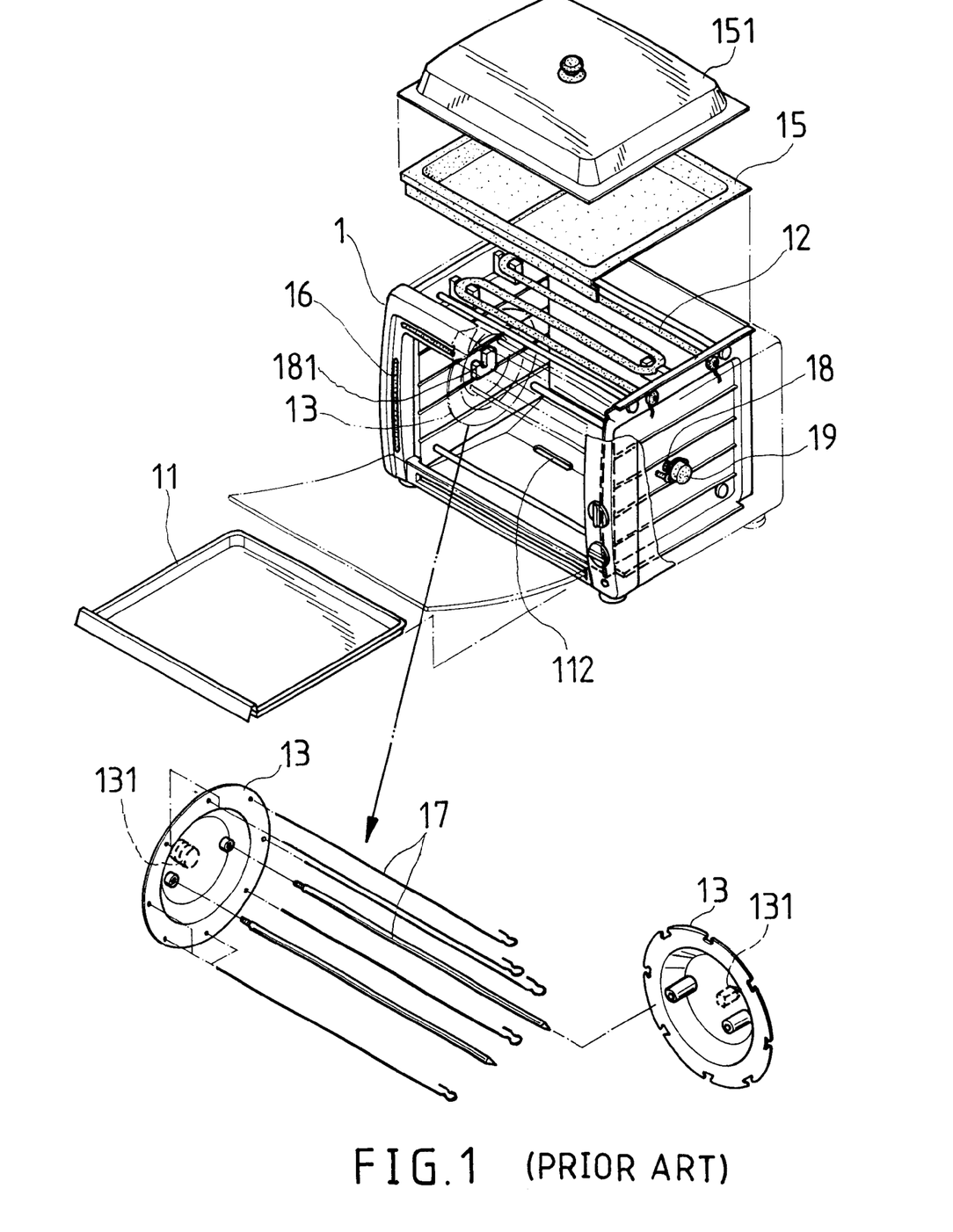
FIG. 1 is a perspective exploded view of a conventional rotisserie oven structure.
Figure 2:
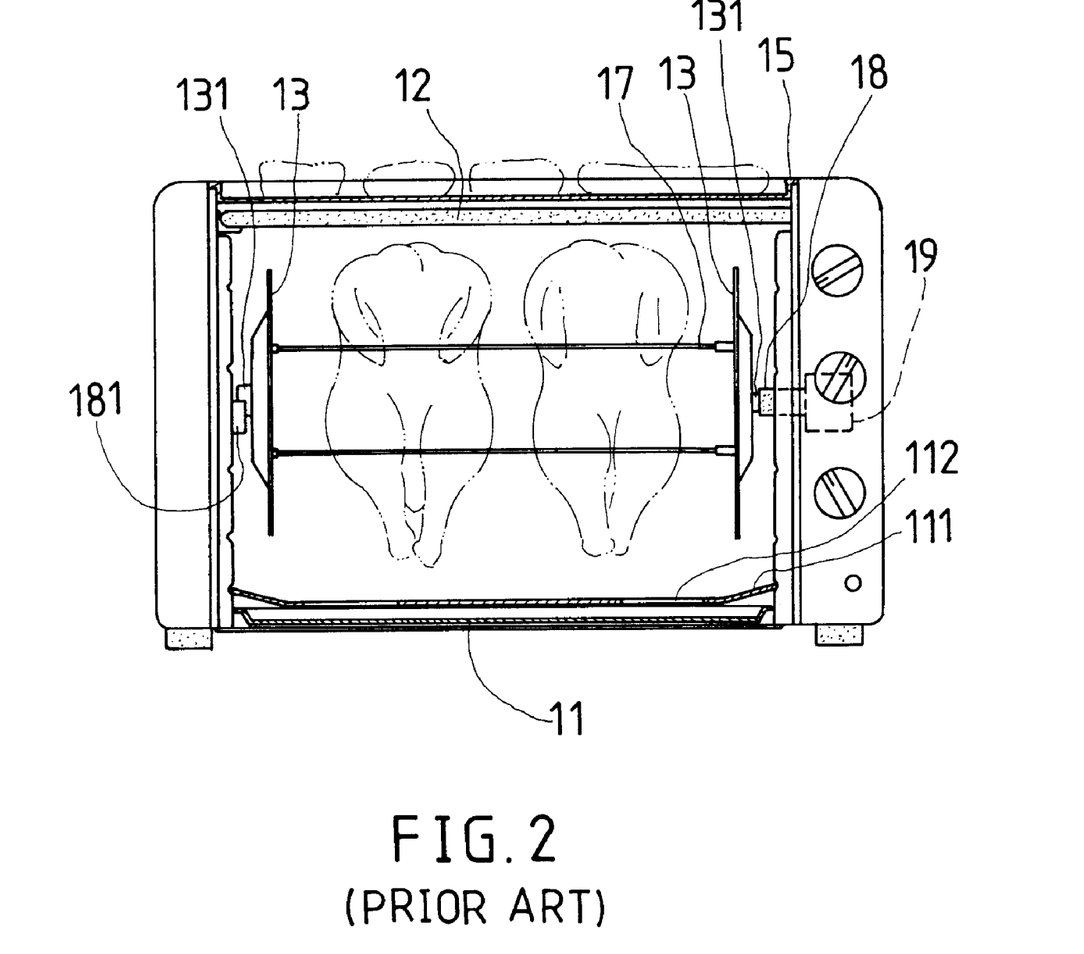
FIG. 2 is a schematic sectional view of the conventional rotisserie oven while being operated.
Figure 3:
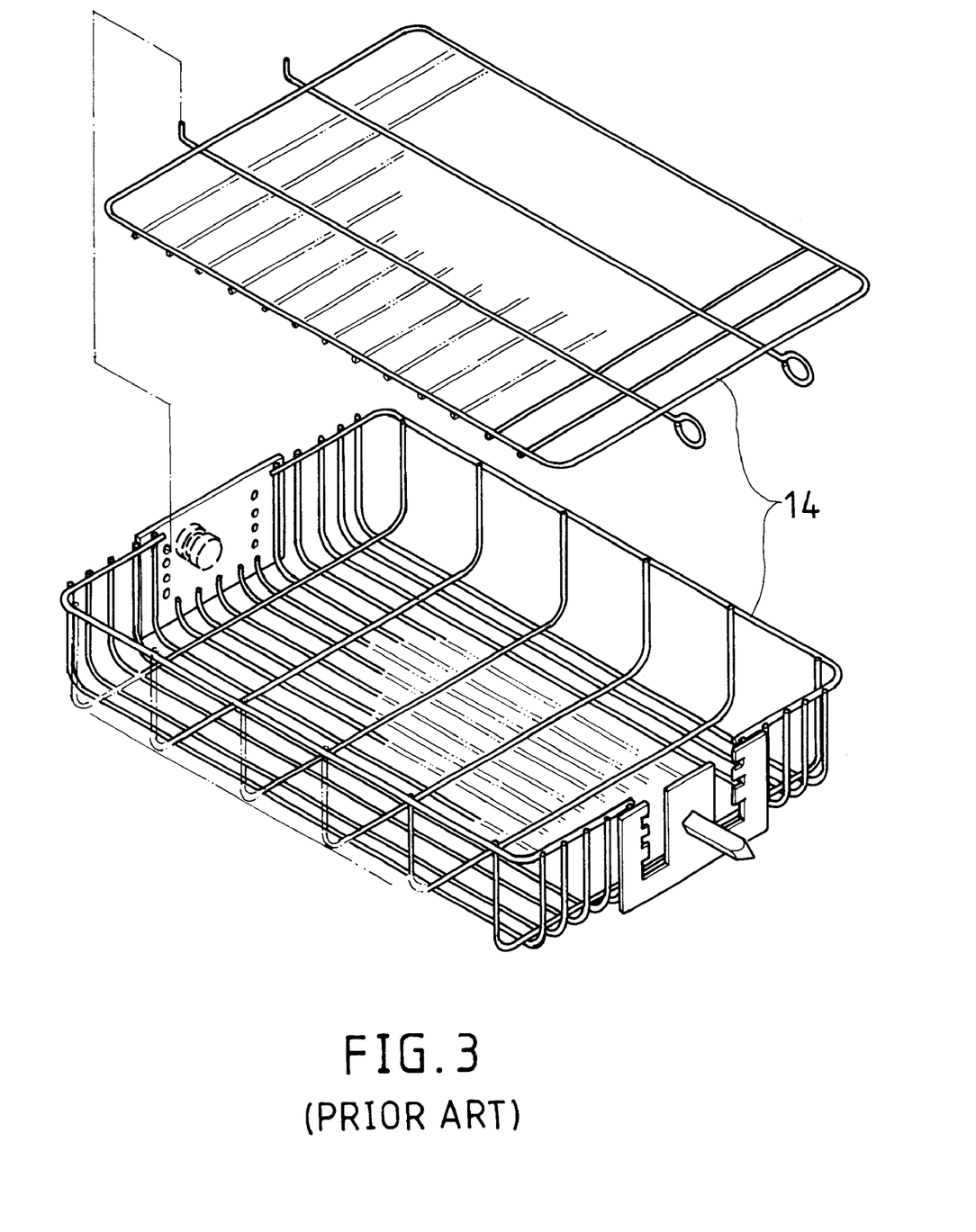
FIG. 3 is a perspective exploded view of a rotary basket of the conventional rotisserie oven.
Figure 4:
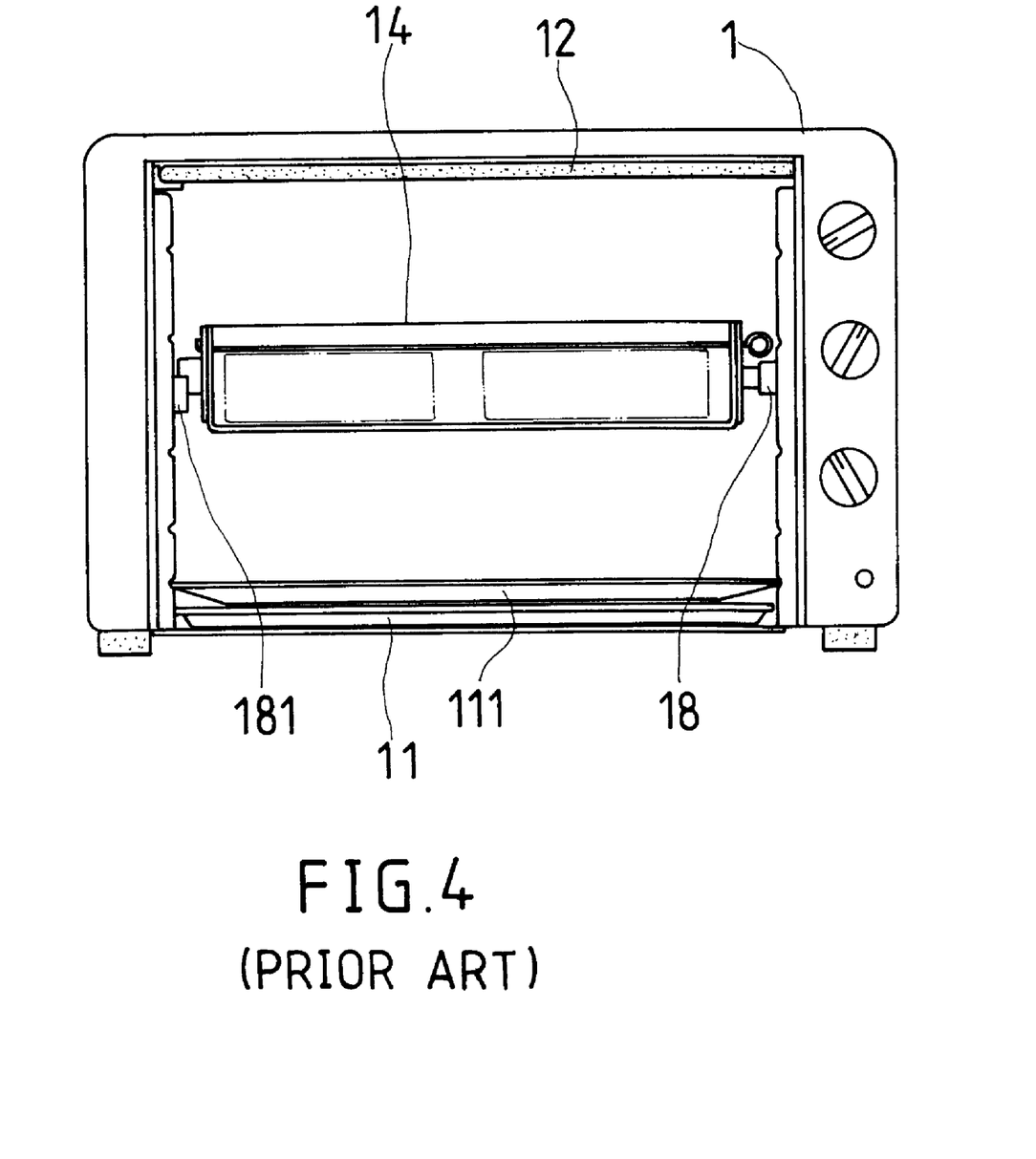
FIG. 4 is a front view of a rotary basket provided in the conventional rotisserie oven.

In the process of roasting, some oil drops from the roasted food will drip on the oil-guidance plate 111 below the electric heating tubes 12, flow to the oil exit 112 and then drip on the oil-collecting plate 11. When the rotisserie oven being operated, the temperature in the chamber is very high, and the steam heat will permeate outward from the circumference of the entrance so as to lower the roasting efficiency of the rotisserie oven. Therefore, steam-tight silicone straps 16 are provided on the circumference of the entrance to prevent the door plank from giving out noises when being shut up and to steam-tightly seal up the entrance while the rotisserie oven being operated.

The above-mentioned conventional rotisserie oven can be operated to roast the food well mainly by means of the electric heating tubes 12 which can produce heat. However, the electric heating tubes 12 are provided at the upper or lower position in the chamber, and the temperature of the upper or lower positions in the chamber is extremely high. Therefore, the food in the chamber can not be roasted evenly. It not only wastes electricity but also takes much time of roasting.

SUMMARY OF THE INVENTION

Accordingly, the present invention is to provide a a rotisserie oven which can substantially obviates the drawback of the related conventional art.

An object of the present invention is to provide a a rotisserie oven structure which is provided with a heat circulating box on one outer wall of the main body.

Another object of the present invention is to provide a rotisserie oven whose heat circulating box is equipped with a system for heat circulation so as to make the food be roasted evenly and to shorten the roasting time.

To achieve the advantage, a rotisserie oven structure in the present invention is provided with a heating circulating box on one outer wall of the main body. When the electric heating tubes being heated, the heat will flow through the lower series of heat circulating perforations into the lower inner room of the heat circulating box, and the heat will be blown upward to the upper inner room by means of the reversal rotation of the inner fan. Because of the slope formed at the upper part of the housing and the close contact of flanged ribs and grooves, the heat in the upper part of the housing can be prevented from flowing downwardly. Accordingly, the heat will flow through the upper series of heat circulating perforations into the interior of the main body and can be fully and evenly absorbed by food through the circulation of the heat circulating box so as to make the food be roasted evenly and to shorten the roasting time.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 5:
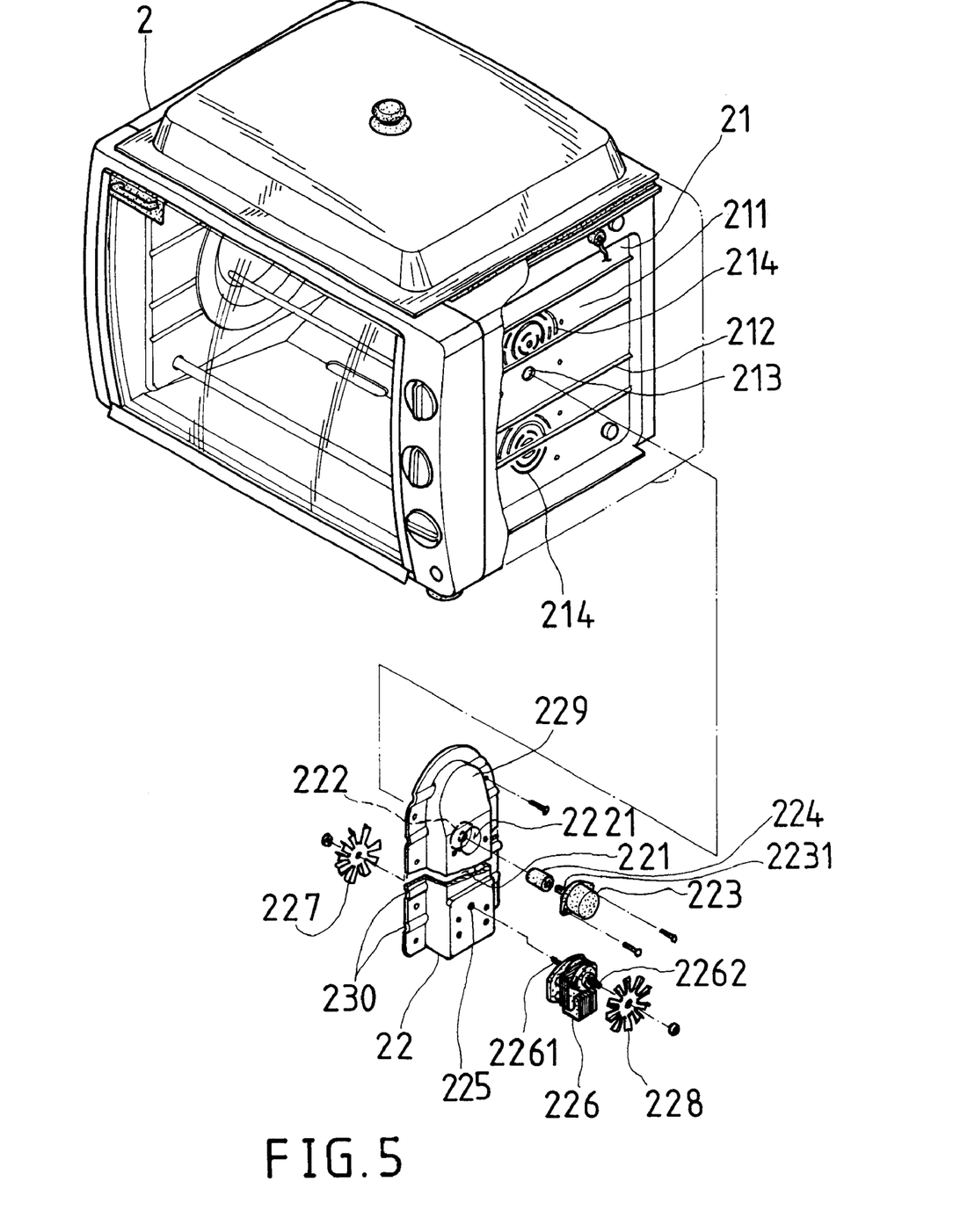
FIG. 5 is a perspective exploded view of an embodiment of a heat circulating box being provided on one outer wall of the -main body of a rotisserie oven in accordance with the present invention.

Referring to FIG. 5, a preferred embodiment of the rotisserie oven structure in the present invention is provided with a heat circulating box 22 on one outer wall 21 of the main body 2. The heat circulating box 22 is provided with an opening 2221 in the protuberance 222 protruding at the upper position in the inner room 221. The opening 2221 is provided to receive an axle 2231 and an axle sleeve 224 of an upper motor 223. A hole 225 is provided in the lower position to receive the inner end 2261 of the axle of a lower motor 226, and then the inner end 2261 penetrates through the central hole of an inner fan 227 to be screwed. The outer end 2262 of the axle of the lower motor 226 penetrates -through the central hole of an outer fan 228 to be screwed. The upper part of the housing of the heat circulating box 22 is provided with a slope 229 so that the upper part of the inner room 221 is narrower than the lower part. The inner circumference of the housing is provided with a plurality of spaced grooves 230. A screw hole 231 is provided between two grooves 230.

Figure 6:
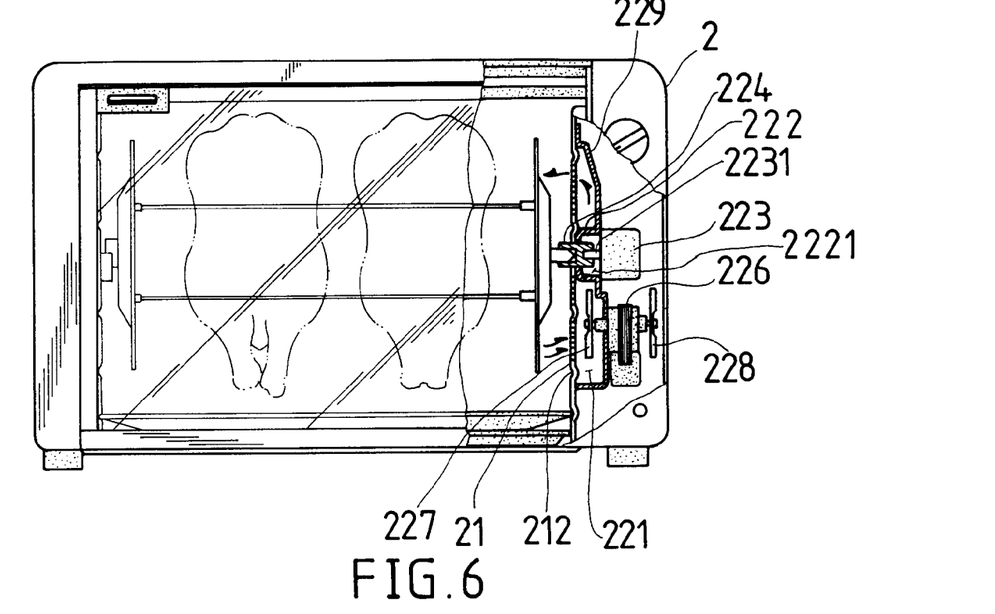
FIG. 6 is a schematic sectional view of the heat circulating box being applied to a rotisserie oven in accordance with the present invention.
Figure 7:
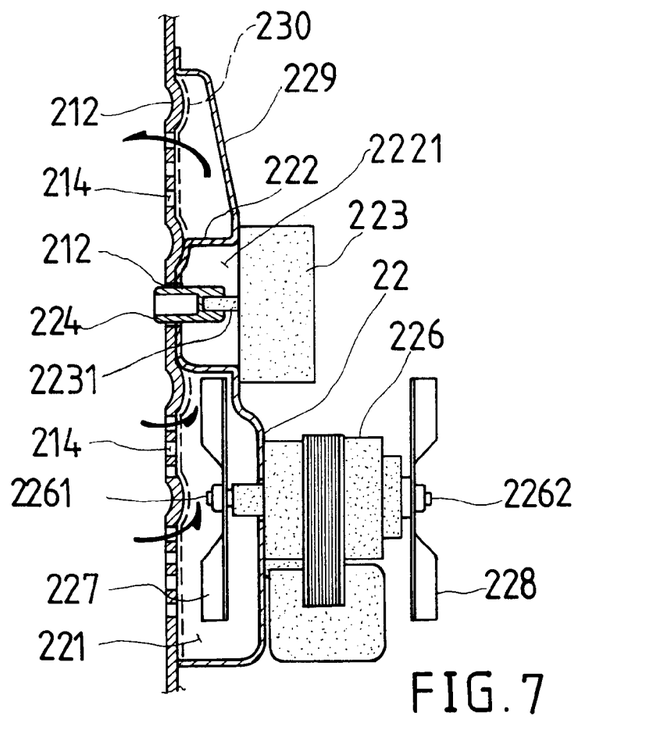
FIG. 7 is an enlarged sectional view of the heat circulating box being operated in accordance with the present invention.
Figure 8:
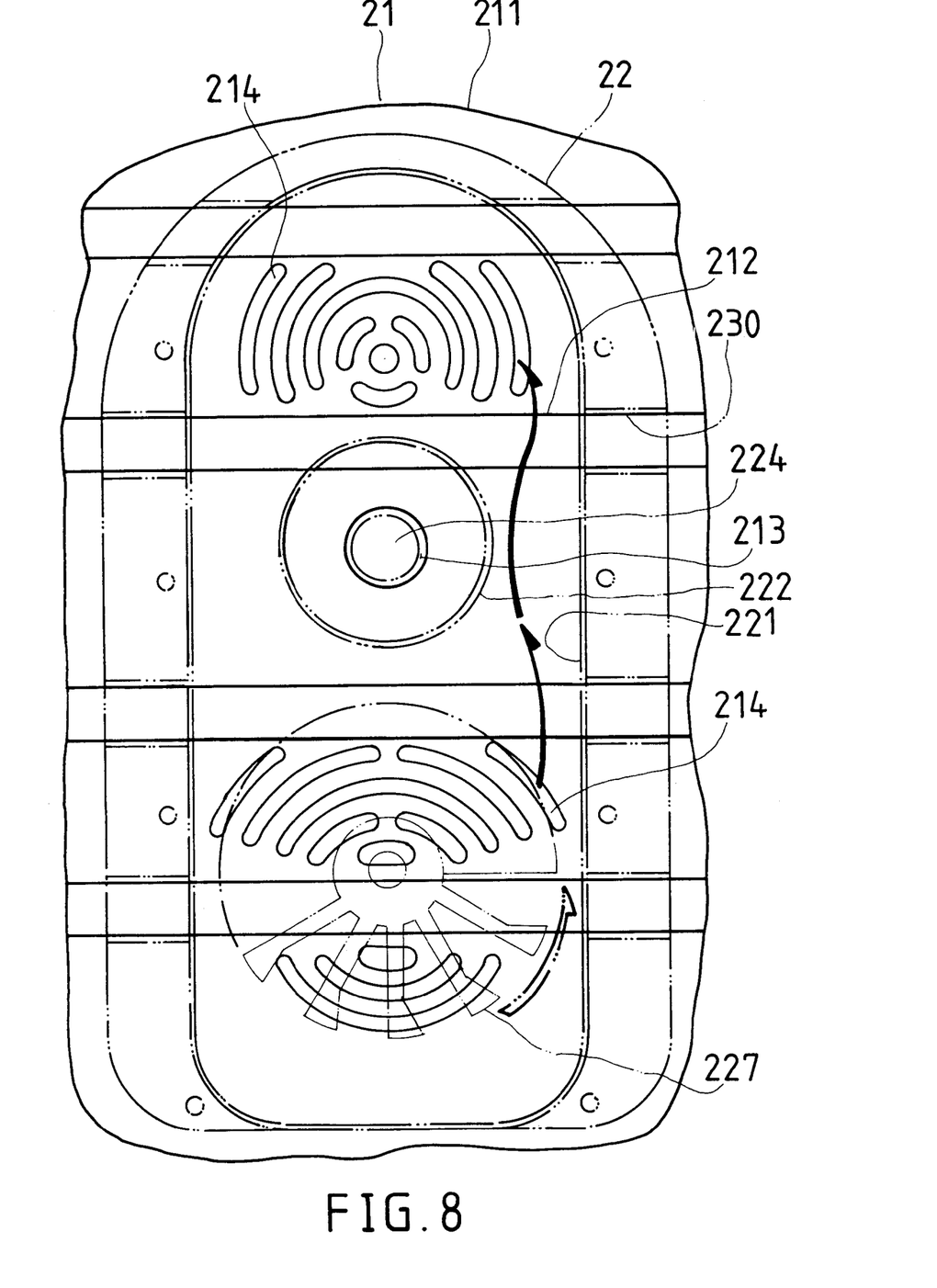
FIG. 8 is a schematic cross-sectional view of the heat being operated in accordance with the present invention; and, FIG. 9 is a sectional view of another embodiment of the heat circulating box in accordance with the present invention.

While being assembled, referring to FIGS. 6,7 and 8, the heat circulating box 22 together with the motor 226 is secured to one outer wall 21 of the main body 2 by screws after the registration of screw holes 231 and 211 in the circumference of the housing and the outer wall 21, and each groove 230 closely covers each flanged rib 212 on the outer wall 21. The axle sleeve 224 of the upper motor 223 penetrates the opening 213 in the outer wall 21, and the upper and lower parts of the inner room 221 respectively face each series of heat circulating perforations 214 in the outer wall 21.

While being operated, the electric heating tubes in the main body 2 are heated and the heat will flow through the lower series of heat circulating perforations 214 into the lower inner room 21 of the heat circulating box 22, and then the heat will be blown upward to the upper inner room 221 by means of the reversal rotation of the fan 227. Because of the slope 229 formed at the upper part of the housing and the close contact of flanged ribs 212 and grooves 230, the heat in the upper part of the housing can be prevented from flowing downwardly. Accordingly, the heat will flow through the upper series of heat circulate 214 into the interior of the main body 2. The heat produced from the electric heating tubes can be fully and evenly absorbed by food through the circulation of the heat circulating box 22 so as to make the food be roasted evenly and to shorten the roasting time.

When the heat in the lower part of the inner room 221 being blown to the upper part of the inner room 221, the temperature becomes extreme high, and the axle 2231 and the motor 223 are protected by the protuberance 222 from being influenced by the high temperature. The design of the protuberance 222 can also improve the heat circulation efficiency because it efficiently prevents the heat from flowing downwardly.

Figure 9:
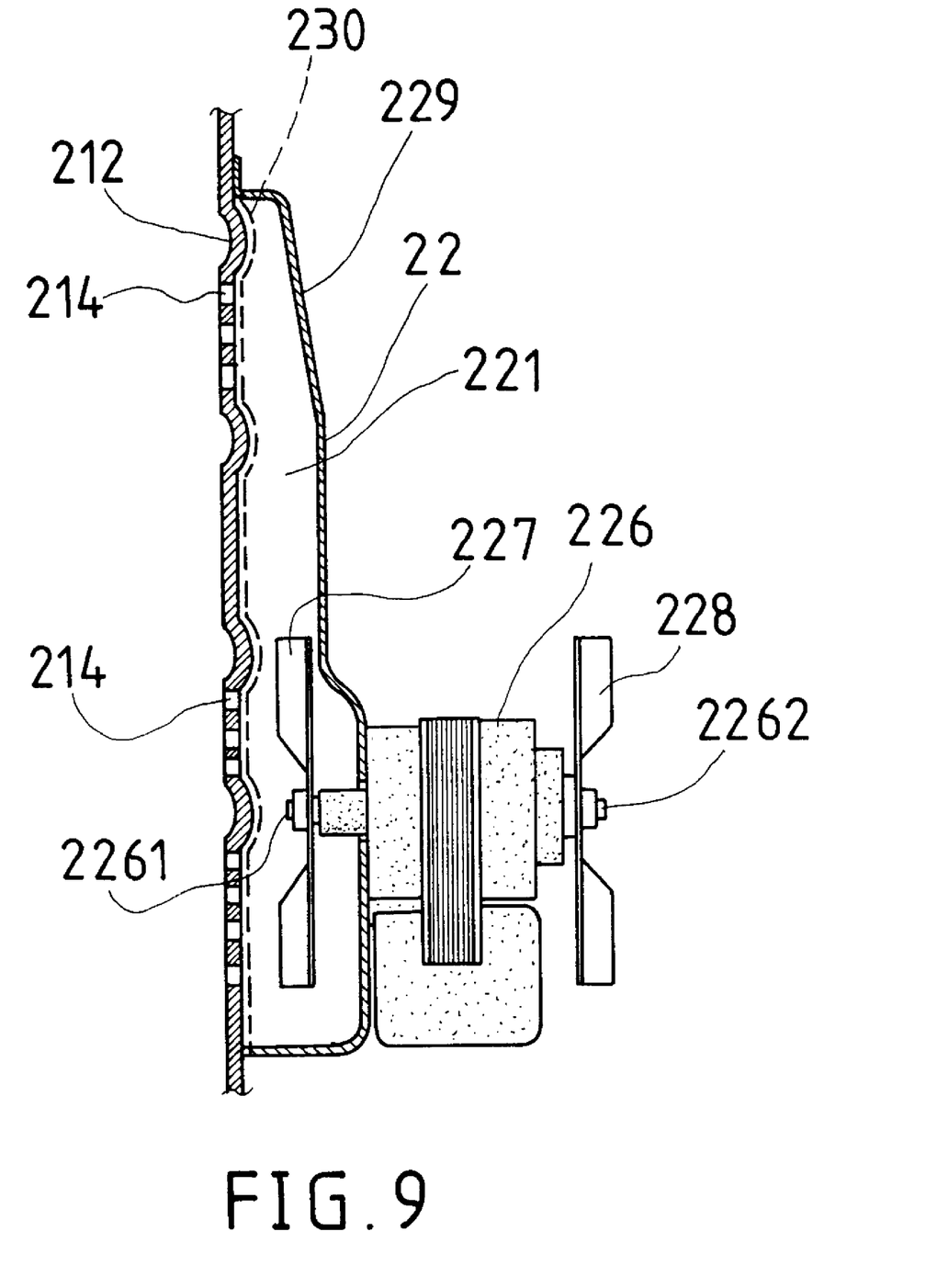

Alternatively, the heat circulating box 22 can only be provided with a motor 226 at the lower part, as shown in FIG. 9. It can have the same efficiency of heat circulation.

While the preferred embodiments of the invention have been described above, it will be recognized and understood that various. modifications may be made therein and the appended claims are intended to cover all such modifications which may fall within the spirit and scope of the invention.

What is claimed is:

1. A rotisserie oven structure comprising:

a heat circulating box being provided on one outer wall of the main body of a rotisserie oven, said heat circulating box being provided with an opening in a protuberance protruding at the upper position in the inner room of said heat circulating box, said opening being provided to receive an axle and an axle sleeve of an upper motor, a hole being provided in the lower position to receive an axle of a lower motor, the inner end of said axle of said lower motor penetrating through the central hole of a inner fan to be screwed, the outer end of said axle of said lower motor penetrating through the central hole of an outer fan to be screwed, when t-he electric heating tubes. in the main body are heated, the heat flowing through the lower series of heat circulating perforations into the lower inner room of said heat circulating box, the heat being blown upward to the upper inner room by means of the reversal rotation of said. inner fan and flowing through the upper series of heat circulating perforations into the interior of the main body.

2. A rotisserie oven structure as recited in claim 1, wherein the upper part of the housing of said heat circulating box is provided with a slope so that the upper part of the inner room is narrower than the lower part.

3. A rotisserie oven structure as recited in claim 2, wherein the inner circumference of the housing is provided with a plurality of spaced grooves, and a screw hole being provided between two said grooves.

4. A rotisserie oven structure as recited in claim 3, wherein said upper motor and the axle are protected by said protuberance from being influenced by the high temperature, and said protuberance being able to prevent the heat from flowing downwardly so as to improve the heat circulation efficiency.

* * * * *